United States Patent [19]

Nakashima et al.

[11] Patent Number: 4,771,222
[45] Date of Patent: Sep. 13, 1988

[54] TOOL COORDINATE SYSTEM SETTING SYSTEM

[75] Inventors: Seiichiro Nakashima; Kenichi Toyoda, both of Hino; Shinsuke Sakakibara, Komae; Tatsuo Karakama, Hino, all of Japan

[73] Assignee: Fanuc Ltd, Minamitsuru, Japan

[21] Appl. No.: 843,696

[22] PCT Filed: Jul. 11, 1985

[86] PCT No.: PCT/JP85/00390

§ 371 Date: Mar. 4, 1986

§ 102(e) Date: Mar. 4, 1986

[87] PCT Pub. No.: WO86/00727

PCT Pub. Date: Jan. 30, 1986

[30] Foreign Application Priority Data

Jul. 12, 1984 [JP] Japan ............................... 59-144609

[51] Int. Cl.$^4$ .............................................. G05B 19/18
[52] U.S. Cl. ..................................... 318/572; 318/568; 318/632; 364/167.01
[58] Field of Search ........ 318/568 A, 568 B, 568 AB, 318/568 D, 568 E, 568, 569, 572, 578, 632; 364/513, 300, 191, 193, 167, 170; 901/3, 4, 5, 15

[56] References Cited

U.S. PATENT DOCUMENTS

| | | | |
|---|---|---|---|
| 4,456,961 | 6/1984 | Price | 318/568 B |
| 4,495,588 | 1/1985 | Nio | 364/513 |
| 4,561,050 | 12/1985 | Iguchi | 318/568 |
| 4,580,229 | 4/1986 | Koyama | 364/513 |
| 4,581,566 | 4/1986 | Ekstrom | 318/568 |

*Primary Examiner*—Bentsu Ro
*Attorney, Agent, or Firm*—Staas & Halsey

[57] ABSTRACT

A system for setting a tool coordinate system brings directions (t, u, v) of respective basic axes of the tool coordinate system into coincidence with directions (X, Y, Z) of basic axes of a robot reference coordinate system. A tool center point (TCP) serves as an origin, and the system causes a robot to memorize metric values on each motion axis of the robot at the moment of coincidence as setting information for setting the tool coordinate system. The system uses this setting information as information for subsequent robot motion. With the present invention, the setting of tool coordinates, which was a troublesome operation in the prior art, can be performed easily and accurately through a simple method.

2 Claims, 3 Drawing Sheets

TOOL COORDINATE SYSTEM SETTING SYSTEM

BACKGROUND OF THE INVENTION

This invention relates to a tool coordinate system setting system and, more particularly, to a system for setting a tool coordinate system having a fixed relationship to a reference coordinate system of a robot.

The spread of robots has recently become quite conspicuous and robots are finding use in many fields. Under these circumstances, robots are required to perform both accurately and reliably.

Highly articulated robots have a large number of axes of motion and are extensively used for operations such as welding, due to their ability to execute sophisticated tasks. FIG. 5 is a perspective view of an industrial robot having five axes. In the Figure, BS denotes a base set on the floor of a factory or the like, the upper portion of the base being provided with a $\theta$-axis drive mechanism 1 for driving a $\theta$ axis. Numeral 2 denotes a W-axis drive mechanism, 3 a W-axis arm driven by the W-axis drive mechanism 2, and 4 a U-axis arm driven by a U-axis drive mechanism 5 via a U-axis link 6. Numeral 7 denotes a robot wrist the distal end of which is provided with a hand 7a. Fixedly mounted on the hand 7a is a tool 8 such as a welding torch. Numeral 9 denotes an $\alpha$-axis drive mechanism, and numeral 10 designates a $\beta$-axis drive mechanism. The wrist 7, hand 7a and tool 8 are shown in enlarged form in FIG. 6.

As shown in FIG. 6, hand attitude vectors in the hand coordinate system are denoted $l$, $m$, $n$, and the basic axes of the tool coordinate system are designated $t$, $u$, $v$. Further, Oh represents the origin of the hand coordinate system, and TCP denotes the tool center point. Though the robot memorizes its own reference coordinate system as well as the hand coordinate system, difficulty is involved in setting the position of the tool 8 mounted on the hand 7a. Specifically, it is difficult for the robot to ascertain how the hand coordinate system and tool coordinate system are related to each other. In particular, since many kinds of tools 8 can be mounted on the hand 7a and are set at positions that differ from one another, ascertaining the correct position of a tool is a very difficult task.

SUMMARY OF THE INVENTION

It is an object of the present invention to provide a tool coordinate system setting system capable of setting a tool position through a simple method and of controlling the tool in a highly accurate manner.

The present invention provides a tool coordinate system setting system for setting a position of a tool mounted on a hand of a robot. The system is so arranged as to set and store a tool center point in the tool coordinate system, treat the tool center point as an origin, bring the axial directions of the respective basic axes of the tool coordinate system into coincidence with the axial directions of the basic axes of the robot reference coordinate system, and have the robot memorize metric values on the motion axes of the robot at the moment of coincidence as setting information for setting the tool coordinate system.

According to the present invention, the setting of tool coordinates, which was a troublesome operation in the prior art, can be performed easily and accurately through a simple method. The invention therefore has significant practical advantages.

DESCRIPTION OF THE PREFERRED EMBODIMENT

An embodiment of the present invention will now be described in detail with reference to the drawings.

Figure 1:
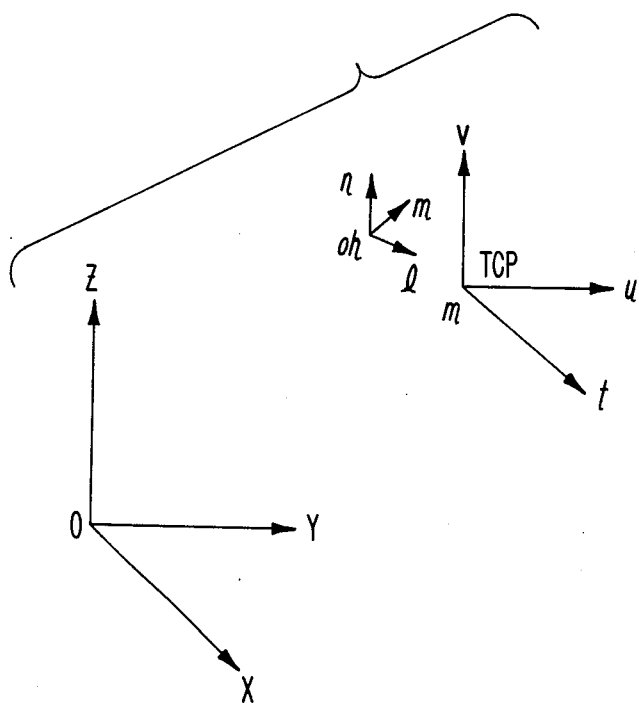
FIG. 1 is a diagram for describing the setting of a tool coordinate system according to the present invention.
Figure 2:
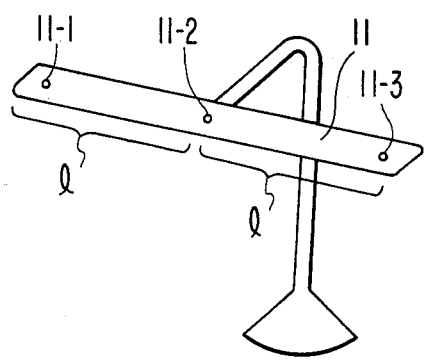
FIG. 2 is a perspective view for describing a jig used in setting a tool center point of a tool.
Figure 3:
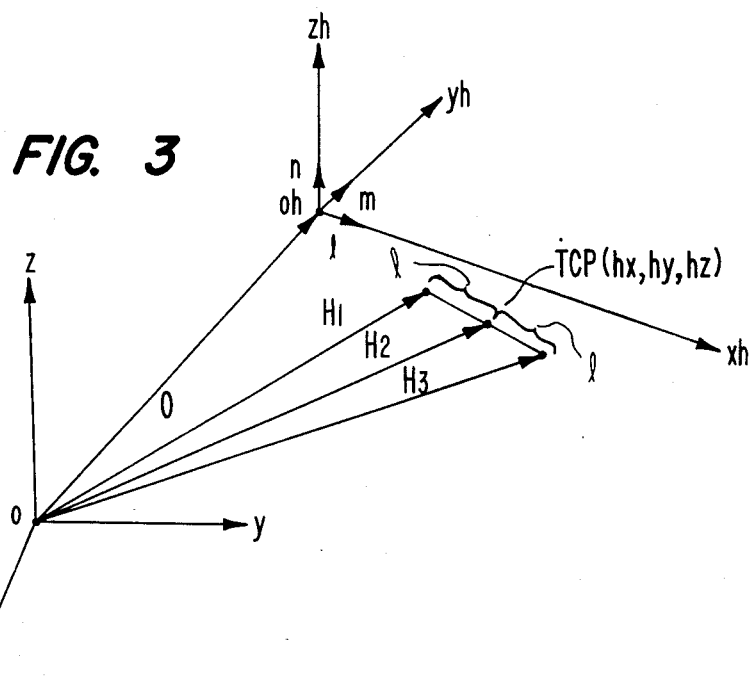
FIG. 3 is a diagram for describing the setting of a tool center point of a tool.

FIG. 1 is a diagram for describing the setting of a tool coordinate system according to the present invention; FIG. 2 is a perspective view of a jig used in setting a tool center point in a tool coordinate system; and FIG. 3 is a diagram for describing the setting of a tool center point in a tool coordinate system. The setting of a tool coordinate system will now be described in detail on the basis of these drawings.

Figure 4:
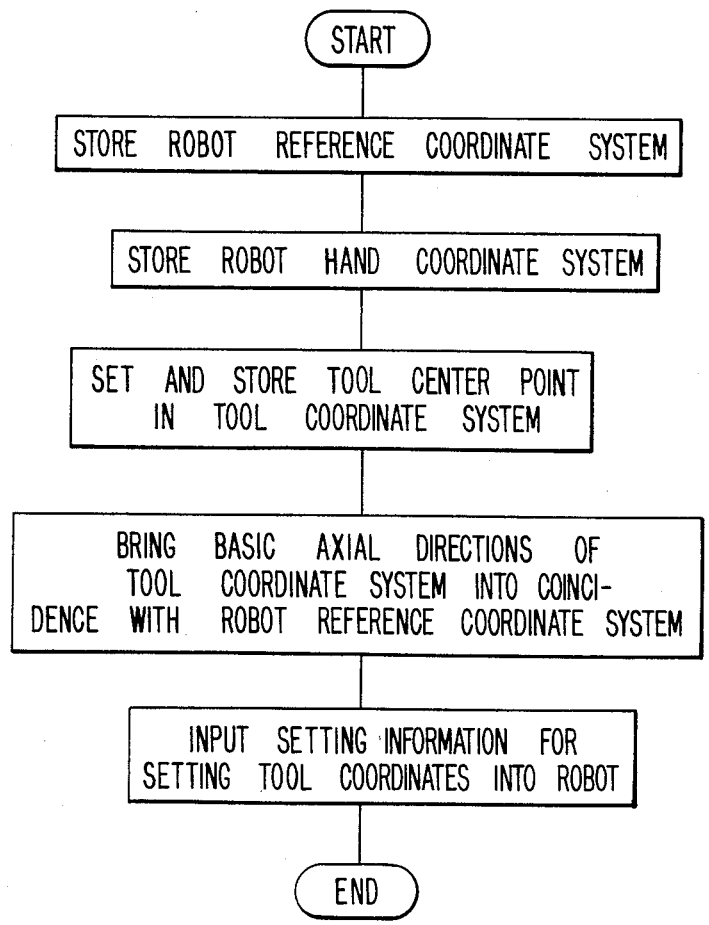
FIG. 4 is a flowchart indicating the setting of a tool coordinate system.
Figure 5:
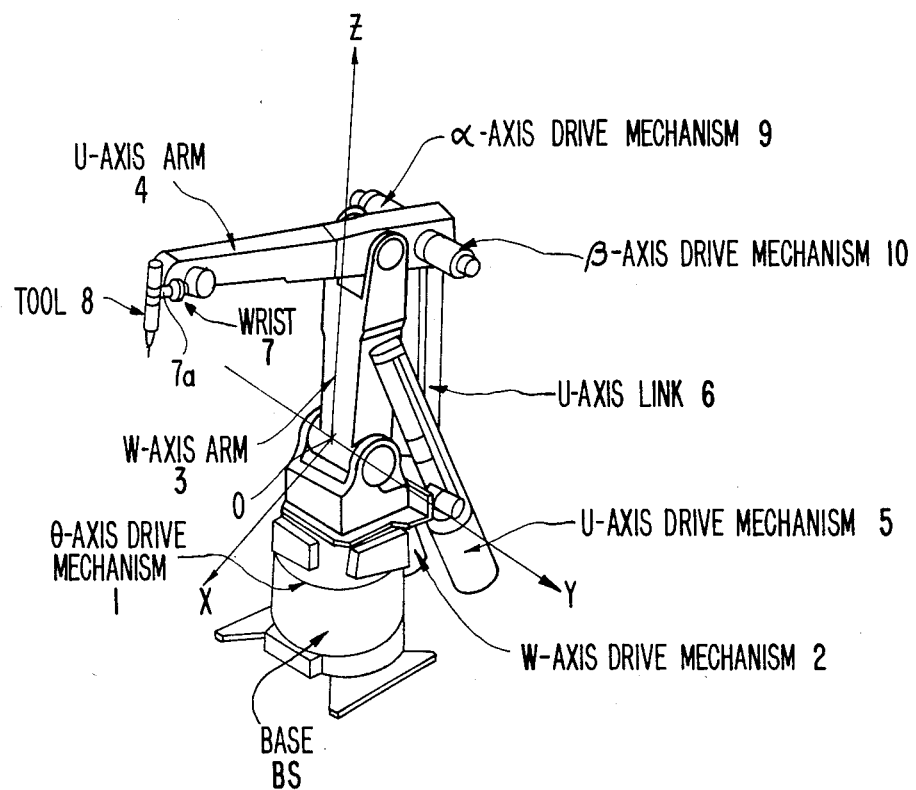
FIG. 5 is a perspective view of a common robot having multiple articulations.
Figure 6:
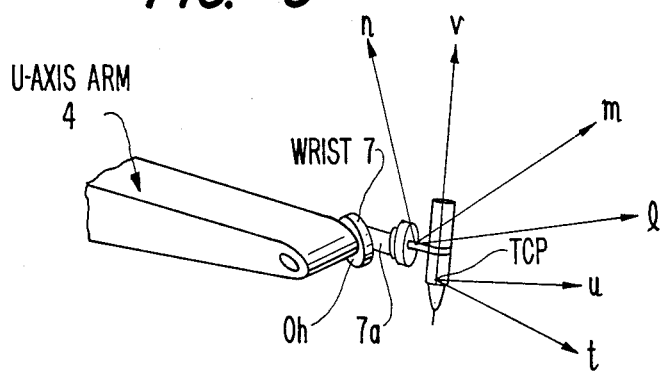
FIG. 6 is a perspective view showing, in enlarged form, a hand and a tool portion of the robot illustrated in FIG. 5.

In FIG. 1, X, Y, Z represent a basic coordinate system of a robot, and O indicates the origin of the coordinate system. This basic coordinate system is a coordinate system similar to X, Y, Z shown in FIG. 5. Further, $l$, , $n$ denote hand attitude vectors in a robot hand coordinate system. These vectors are memorized by a robot. Next, $t$, $u$, $v$ denote the basic axes of a tool coordinate system. In the present invention, these are the axes that are to be set. This will now be described sequentially with reference to the flowchart shown in FIG. 4.

(1) Storage of robot reference coordinate system

The robot memorizes its own coordinate system in advance. This coordinate system shall serve as the basis for the motions of the various portions of the robot.

(2) Storage of robot hand coordinate system

A coordinate transformation from values on each articulation axis of the robot is performed and the hand coordinate system is stored in advance.

(3) Setting and storage of tool center point in tool coordinate system.

FIG. 2 illustrates a jig for setting a tool center point. A jig 11 specifies three colinear holes 11-1, 11-2, 11-3 equally spaced apart at a distance l on the jig 11. The tool center point in FIG. 3, any one of the holes in the jig 11 is brought into agreement with the tool center point TCP. In the illustrated embodiment, the center hole 11-2 is made to coincide with the tool center point. Further, xh, yh, zh represent the hand coordinate system, and hx, hy, hz indicate the position of the tool center point (TCP) in the hand coordinate system.

Since the distances between the adjacent holes in the jig are the same and equal to l (already known), we have $$H_1 - H_2 = H_2 - H_3 \qquad (1)$$

(wherein $H_1$, $H_2$ and $H_3$ represent vectors obtained by connecting the origin O of the basic coordinate system of the robot with the holes 11-1, 11-2 and 11-3 of the jig 1., on the basis of which the robot memorizes vectors $H_1, H_2, H_3$ as known quantities.

Next, the robot is taught the points 11-1, 11-2 (TCP), 11-3, solely on the basis of which the position (hx, hy, hz) of the tool center point TCP in the hand coordinate system can be set through calculations performed by a processing unit built in the robot. Specifically, the following equations will hold:

$$H_1 = O_1 + hx\, l_1 + hy\, m_1 + hz\, n_1 \tag{2}$$

$$H_2 = O_2 + hx\, l_2 + hy\, m_2 + hz\, n_2 \tag{3}$$

$$H_3 = O_3 + hx\, l_3 + hy\, m_3 + hz\, n_3 \tag{4}$$

In the above equations, the robot memorizes the vectors $O_1, O_2, O_3, l_1, l_2, l_3, m_1, m_2, m_3, n_1, n_2, n_3$ in advance as position setting information, these vectors being known. In addition, $H_1, H_2, H_3$ also are known. The above equations (2) through (4) are three-dimensional linear equations in which hx, hy, hz are unknown. The processing unit of the robot solves the three of the equations instantaneously and obtains the unknowns hx, hy, hz, namely the tool center point TCP.

(4) Bringing basic axial directions of tool coordinate system into coincidence with robot reference coordinate system The robot is moved in a jog-feed mode by pressing jog buttons on a teach pendant in such a manner that the basic axes $t, u, v$ of the tool coordinate system to be set are made parallel to the X, Y, Z axes of the robot reference coordinate system already defined, as shown in FIG. 1.

(5) Setting of data used for setting tool coordinates

Metric values on each of the motion axes ($\theta$, W, U, $\alpha$, $\beta$ axes) of the robot at the moment all of the basic axes $t, u, v$ of the above-mentioned tool coordinate system become parallel to the X, Y, Z axes of the robot coordinate system are entered as setting data for setting tool coordinates.

By adopting such an arrangement, the tool coordinate system, namely basic Cartesian coordinate values of the tool center point TCP and the hand attitude vectors $l, m, n$, can be obtained from the values on each of the motion axes ($\theta$, W, U, $\alpha$, $\beta$ axes) of the robot. Conversely, it is obvious that each of the motion axes of the robot can be calculated from the basic Cartesian coordinate values of the tool center point TCP and hand attitude vectors $l, m, n$. However, in the present embodiment, the basic axes $t, u, v$ of the tool coordinate system are used instead of the hand attitude vectors $l, m, n$, so that the robot can be commanded in the tool coordinate system. In other words, teaching can be executed in the reference coordinate system of the robot on the basis of the tool coordinate system.

It is obvious that both a transformation and inverse transformation can be performed between the hand attitude vectors $l, m, n$ and the basic axes $t, u, v$ of the tool coordinate system at all times. The reason for this is that since the hand coordinate system and the tool coordinate system are always fixed in terms of their relative positions in space, the following equations will hold with the aid of a single $3 \times 3$ fixed matrix (M):

$$\begin{pmatrix} tx & ux & vx \\ ty & uy & vy \\ tz & uz & vz \end{pmatrix} = \begin{pmatrix} lx & mx & nx \\ ly & my & ny \\ lz & mz & nz \end{pmatrix} \times (M)$$

$$\parallel \quad \parallel \quad \parallel \qquad \parallel \quad \parallel \quad \parallel$$

$$t \quad\; v \qquad\quad l \;\; m \;\; n$$

$$\begin{pmatrix} lx & mx & nx \\ ly & my & ny \\ lz & mz & nz \end{pmatrix} = \begin{pmatrix} tx & ux & vx \\ ty & uy & vy \\ tz & uz & vz \end{pmatrix} \times T(M)$$

To obtain (M), the metric values on each of the motion axes of the robot are treated as setting data, and hand attitude vectors $l_o, m_o, n_o$ prevailing at this time are found from these values. Therefore, if this value is made $T(M)$, i.e., if we let $$(l_o, m_o, n_o) = T(M)$$

hold, then a transformation between the hand attitude vectors $l, m, n$ and the basic axes $t, u, v$ of the tool coordinates can be made with facility.

Though the present invention has been described based on an embodiment thereof, the invention is not limited to this embodiment but can also be applied to an industrial robot having six axes. Various modifications can be made in accordance with the gist of the present invention without departing from the scope of the invention.

What is claimed is:

1. A tool coordinate system setting system, having a robot control unit, for setting a position of a tool mounted on a hand or a robot, comprising:
   means for setting a tool center point in a tool coordinate system and for storing the tool center point in the robot control unit,
   means for bringing axial directions of respective basic axes of the tool coordinate system into coincidence with axial directions of basic axes of a robot reference coordinate system, with the tool center point serving as an origin;
   means for storing, in the robot control unit, metric values for each motion axis of the robot as setting information for setting the tool coordinate system at the moment coincidence is established between the axial directions of the respective basic axes of the tool coordinate system and the axial directions of the basic axes of the robot reference coordinate system; and
   a jig for specifying at least three positions, said means for setting the tool center point of said tool coordinate system teaching tool position setting information by using said jig for specifying at least three positions.

2. A method for setting a tool coordinate system for the position of a tool mounted on a hand of a robot, comprising the steps of:
   (a) setting a tool center point in a tool coordinate system by teaching tool position setting information using a jig for specifying at least three positions, and storing the tool center point in the tool coordinate system;
   (b) bringing axial directions of respective basic axes of the tool coordinate system into coincidence with axial directions of basic axes of a robot reference coordinate system, with the tool center point serving as an origin; and
   (c) storing metric values for each motion axis of the robot as setting information for setting the tool coordinate system at the moment coincidence is established between the axial directions of the respective basic axes of the tool coordinate system and the axial directions of the basic axes of the robot reference coordinate system in said step (b).

* * * * *

UNITED STATES PATENT AND TRADEMARK OFFICE
CERTIFICATE OF CORRECTION

PATENT NO. : 4,771,222

DATED : SEPTEMBER 13, 1988

INVENTOR(S) : SEIICHIRO NAKASHIMA ET AL.

It is certified that error appears in the above-identified patent and that said Letters Patent is hereby corrected as shown below:

Col. 2, line 34, "$\ell$, n" should be --$\ell$, m, n--.

Col. 4, line 8, "$t$ $\nu$" should be --$t$ $\mu$ $\nu$--.

Signed and Sealed this

Twenty-fourth Day of January, 1989

Attest:

DONALD J. QUIGG

*Attesting Officer*          *Commissioner of Patents and Trademarks*